US00RE36373E

United States Patent [19]

Benz et al.

[11] E Patent Number: Re. 36,373

[45] Reissued Date of Patent: Nov. 2, 1999

[54] LOW NOX BURNER PROCESS FOR BOILERS

[76] Inventors: Robert P. Benz, 531 Cypress Ave., Hermosa Beach, Calif. 90254; William G. Brown, II, 302 W. Grand Ave., Suite 5A, El Segundo, Calif. 90245

[21] Appl. No.: 09/067,675

[22] Filed: Apr. 28, 1998

Related U.S. Patent Documents

Reissue of:

[64] Patent No.: 5,511,971
Issued: Apr. 30, 1996
Appl. No.: 08/231,745
Filed: Apr. 25, 1994

U.S. Applications:

[63] Continuation-in-part of application No. 08/110,002, Aug. 23, 1993, abandoned.

[51] Int. Cl.[6] ..... F23M 3/00

[52] U.S. Cl. ..... 431/9; 431/115

[58] Field of Search ..... 431/9, 115, 116, 431/174, 177

[56] References Cited

U.S. PATENT DOCUMENTS

| | | | |
|---|---|---|---|
| 3,032,097 | 5/1962 | Marshall | 431/9 |
| 3,146,821 | 9/1964 | Wuetig | 431/9 |
| 3,529,917 | 9/1970 | Hindenlang | 431/174 |
| 4,023,921 | 5/1977 | Anson | 431/9 |
| 4,942,832 | 7/1990 | Finke | 431/115 |
| 5,044,935 | 9/1991 | Peter | 431/9 |
| 5,284,438 | 2/1994 | McGill et al. | 431/9 |
| 5,411,394 | 5/1995 | Beer et al. | 431/9 |

*Primary Examiner*—Carroll B. Dority
*Attorney, Agent, or Firm*—Don Finkelstein

[57] ABSTRACT

Process is described for reducing emissions of nitrogen oxides and carbon monoxide from fuel gas fired boilers by using a computer to closely control the flow rate of combustion air and by installing a duct to allow flue gas to recirculate into the air intake of the boiler. In most cases strict emission standards can be met without making any other mechanical modifications to the boiler. A computer controller maps burner characteristics and controls both a variable speed drive and the damper on the combustion air fan, and a damper on recirculated flue gas to meet emission requirements over the various firing rates while maintaining a stable flame free of pulsations. In some burners a simple cone structure placed in the burner provides additional flame stability.

15 Claims, 6 Drawing Sheets

LOW NOX BURNER PROCESS FOR BOILERS

Matter enclosed in heavy brackets [ ] appears in the original patent but forms no part of this reissue specification; matter printed in italics indicates the additions made by reissue.

FIELD OF THE INVENTION

BACKGROUND OF THE INVENTION

This is a continuation-in-part of U.S. patent application Ser. No. 08/110,002, filed Aug. 23, 1993 since abandoned.

This invention relates to improving the efficiency of boilers and reducing emissions of pollutants such as NOx and carbon monoxide. The most striking advantage of this invention is the ease of retrofitting existing boilers to meet NOx requirements. In addition, energy efficiency is dramatically improved due to the reduced speed of the combustion air fan to provide only the amounts of air needed by the burner to provide complete combustion, and only against as much pressure from the combustion air damper as is needed to dampen and prevent flame pulsations. The preferred embodiment of this invention has been reduced to practice in a variety of boilers ranging from Navy ship boilers to standard "D" type boilers with concentric cone burners, to small fire-tube boilers, -all quite successfully. In essence, NOx emission standards can be met without installing new burners. Essentially a 486 based computer is "piggy-backed" onto the existing flame safety system, and takes control of both air, fuel, and flue gas recirculation (FGR). A toggle switch allows operation to revert back to the existing combustion control system as during installation and service of the computer system. This feature gives extremely high reliability and freedom from downtime during installation of the system. Of course there is no requirement for new burners, rebricking the boiler, etc.

NOx pollutants are becoming recognized as the strongest contributors to smog; without NOx, organic solvents in the air do not form ozone which burns eyes, lungs and is very unhealthful. Therefore the 1990 Clean Air Act calls for dramatic reductions in NOx emissions nationwide. The present invention offers an economical means for reducing NOx while increasing boiler capacity and saving energy.

The preferred embodiment of the invention is quite simple. A duct directs stack gas (flue gas recirculation or FGR) into the inlet of the combustion inlet fan. A computer controller controls combustion air fan speed, and damper positions for combustion air and flue gas recirculation. Although not necessary for most burners, air deflection cones may also be installed to improve combustion efficiency and stability.

Cones fitted into the existing burners force combustion air to the outer edges of the burners, next to the gas distribution perforations in the outer walls of the burners. Placement of the cone within the burner just upstream of the ring of perforations creates turbulence which causes the gas to intimately mix with the combustion air. Typically the perforations are on a 22 inch diameter circle while the cone is 14 inches in diameter, occupying over 40 percent of the flow area of the combustion air. In this way the majority of the combustion air flows within 2 inches of the perforations, ensuring that the injected fuel gas penetrates and mixes thoroughly with the combustion air.

A number of burners are commercially available which use a disc in the center of the burner to shield the burner internals against the radiant heat of the boiler. These discs are often slotted and thus permit the passage of combustion air. Frequently the discs are placed just upstream of an oil injection nozzle which sprays in fuel oil for combustion. In most all cases, the discs block less than one half the area of flow of combustion air, and also allow significant amounts of combustion air to pass through slots in the disc, bypassing the gas ring, and failing to oxidize the injected gaseous fuel.

Large savings in energy is a major side benefit to using the invention to control emissions. Higher energy efficiency results from restricting combustion air intake to the minimum flow required. Typical boilers are operated with significant amounts of excess combustion air to ensure complete combustion of the fuel, freedom from carbon monoxide emissions, and to reduce the risk of explosions due to burner instability. Such excess combustion air is heated and discharged from the stack without serving the useful purpose of oxidizing the fuel. In this invention, a computer controls inlet air flow to admit only enough combustion air to complete combustion, without admitting any significant excess air or lowering boiler efficiency. Because all combustion air flows next to the injection rings, gas is thoroughly mixed with the combustion air to ensure complete combustion without excess air bypassing the combustion areas.

It is therefore an object of the invention to readily retrofit existing boilers for reducing emissions of NOx with a minimum of modifications to the existing boiler and without the need to replace the burners. Another object is to reduce the excess air requirements of the burners when operating on gaseous fuels and therefore to improve the fuel efficiency of the boiler. Yet another object is to create an extremely turbulent region at the point of injection of gaseous fuel into the stream of combustion air. Still another object is provide mixing of the air fuel mixture immediately downstream of injection. Yet another object is to shade the burner parts from radiant heat to reduce their temperature and prolong their life. Still another is to operate more efficiently on gaseous fuels while reducing emissions of NOx. Yet another object is to improve flame stability of the burners when the boiler is operating at low loads. Still another object is to eliminate the need for any additional fans to recirculate flue gas. Still another object is to reduce the energy consumption of the combustion air fan. Yet another object is to reduce the pressure drop of combustion air across the burner. Still another object is to prevent warping or melting of the burner parts due to heat. Other objects of the invention will become apparent in the detailed description of the invention.

BRIEF SUMMARY OF THE INVENTION

In accordance with the invention, a process is described for reducing emissions of nitrogen oxides and carbon monoxide from natural gas fired boilers by computer control using flue gas recirculation. The computer controls the variable speed drive, FGR damper, and combustion air damper. In a few cases it may be necessary of slightly modify the burner. The modified burner has a simple design in which combustion air flows down a cylindrical duct and past a concentric cone partially blocking the end of the duct. Fuel gas is injected through a ring of perforations on the duct walls just downstream of the cone. The blocking action of the cone forces the combustion air to flow close to the perforations on the duct walls to intimately mix the air with the fuel gas. The resulting combustion produces very low levels of emissions and oxygen in the flue gas.

DETAILED DESCRIPTION OF THE PREFERRED EMBODIMENTS

Figure 1:
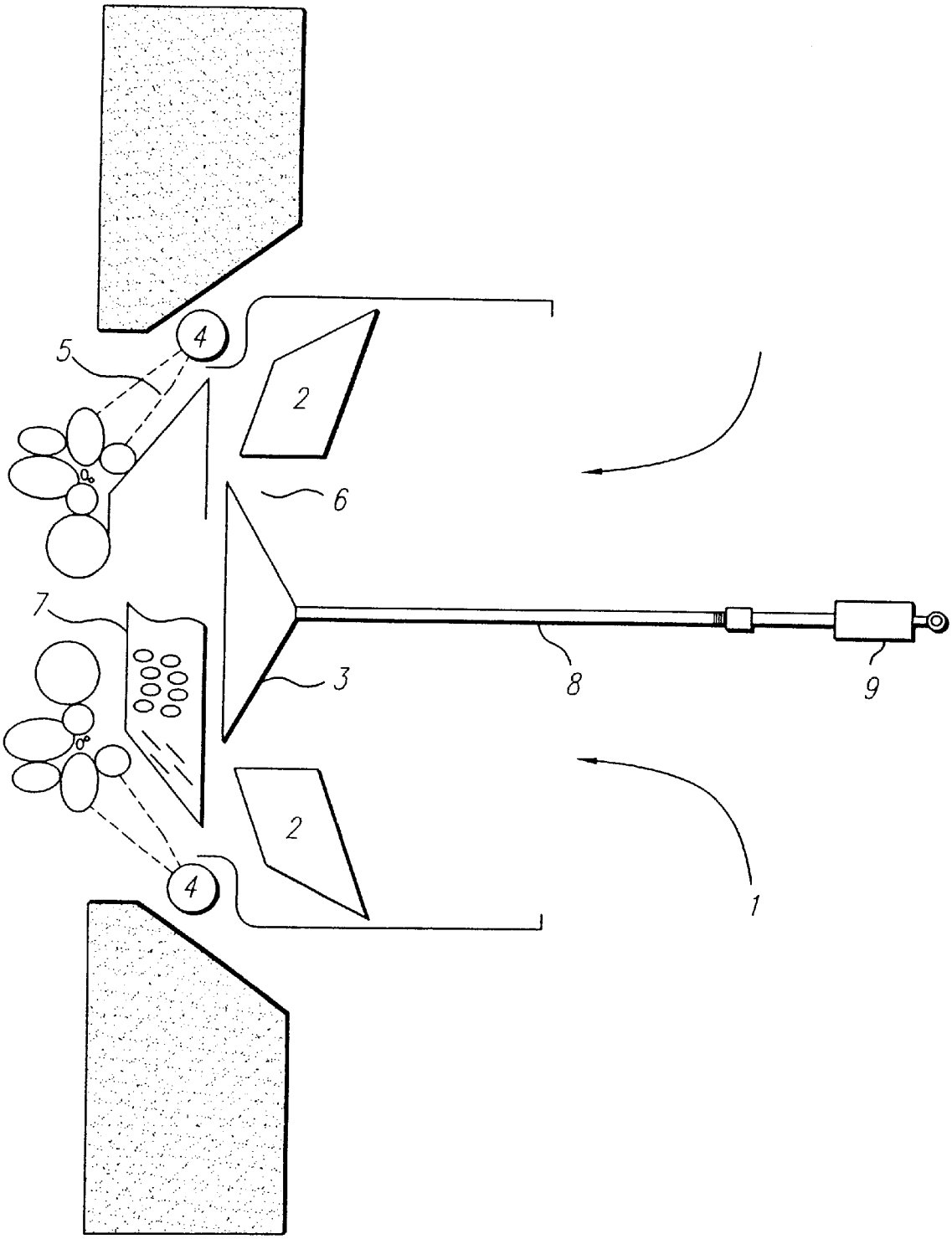
FIG. 1 is a diagrammatic depiction of an emission control system on a boiler including combustion air fan, recirculation duct, main fuel supply system, and pilot-ignitor fuel system.

FIG. 1 is a partially cut-away side view of the burner components suitable for the burner modification aspect of this invention. Combustion air 1 flows through the vanes 2, located in a cylindrical member, which impart swirl to the air to promote turbulence and subsequent mixing. The air then flows past the cone 3, after which the air mixes with fuel gas injected from the gas ring 4 through the perforations 5. Combustion air 1 flows through the annulus 6 which is bounded on the interior by the cone 3, and on the outside by the gas ring 4, which distributes fuel gas to the perforations 5. The entire burner assembly is a cylinder, through which combustion air flows, with the cone 3 placed concentrically within the cylinder. The cone 3 forces the combustion air to flow close to the perforations 4, creating turbulence for intimate mixing of the fuel gas with the combustion air. The perforated hollow cone 7 serves to further mix the gas with combustion air and also to shade internal parts of the burner from the intense heat radiating from inside the boiler. The cone 3 is preferably constructed of a solid sheet of high temperature metal alloy such as 304 or 310 stainless steel or inconel. Conventional burners sometimes employ small perforated plates to promote combustion of liquid fuel which is injected downstream of this plate. However the cone 3 is large, occupying at least 40 percent of the axial flow area of the cylinder, and preferably is solid to prevent combustion air from bypassing the gas injection zone near the perforations 4. The cone 3 is held in place by the rod 8 and may be adjusted forward and back by the actuator 9 pushing the rod 8.

Figure 2:
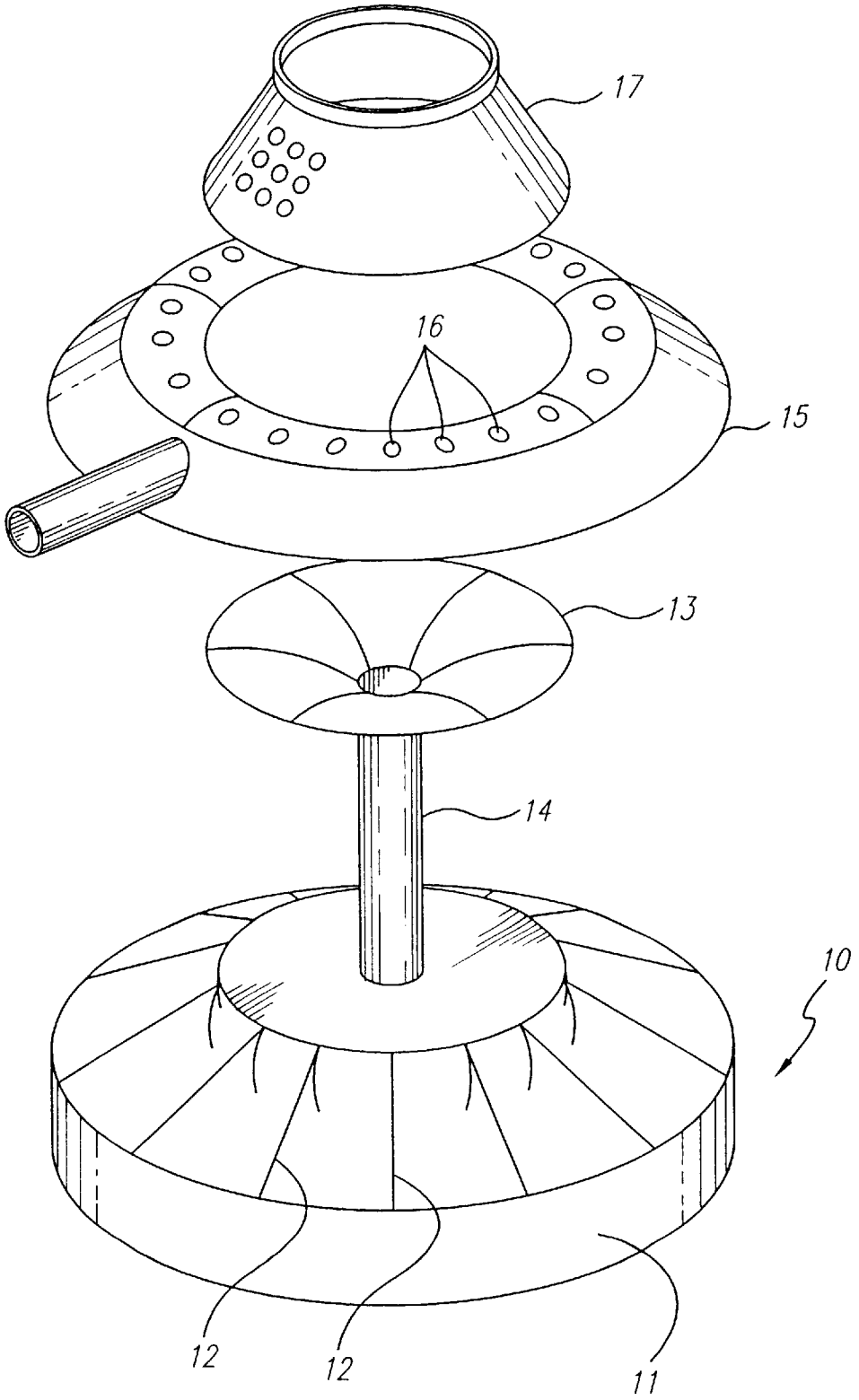
FIG. 2 is a partially cut-away side view of the burner components suitable for the invention.

FIG. 2 is an exploded view of the burner components suitable for the burner modification aspect of this invention. Combustion air 10 flows into the burner register 11, where vanes 12 on the outlet end of the register impart swirl to the stream of combustion air. The cone 13 on the rod 14 confines the flow of combustion air to the outer regions of the register so that the air flows close to the ring 15 where perforations 16 inject fuel gas into the combustion air stream. The perforated hollow cone 17 serves to further mix the fuel with the air to promote efficient combustion.

Figure 3:
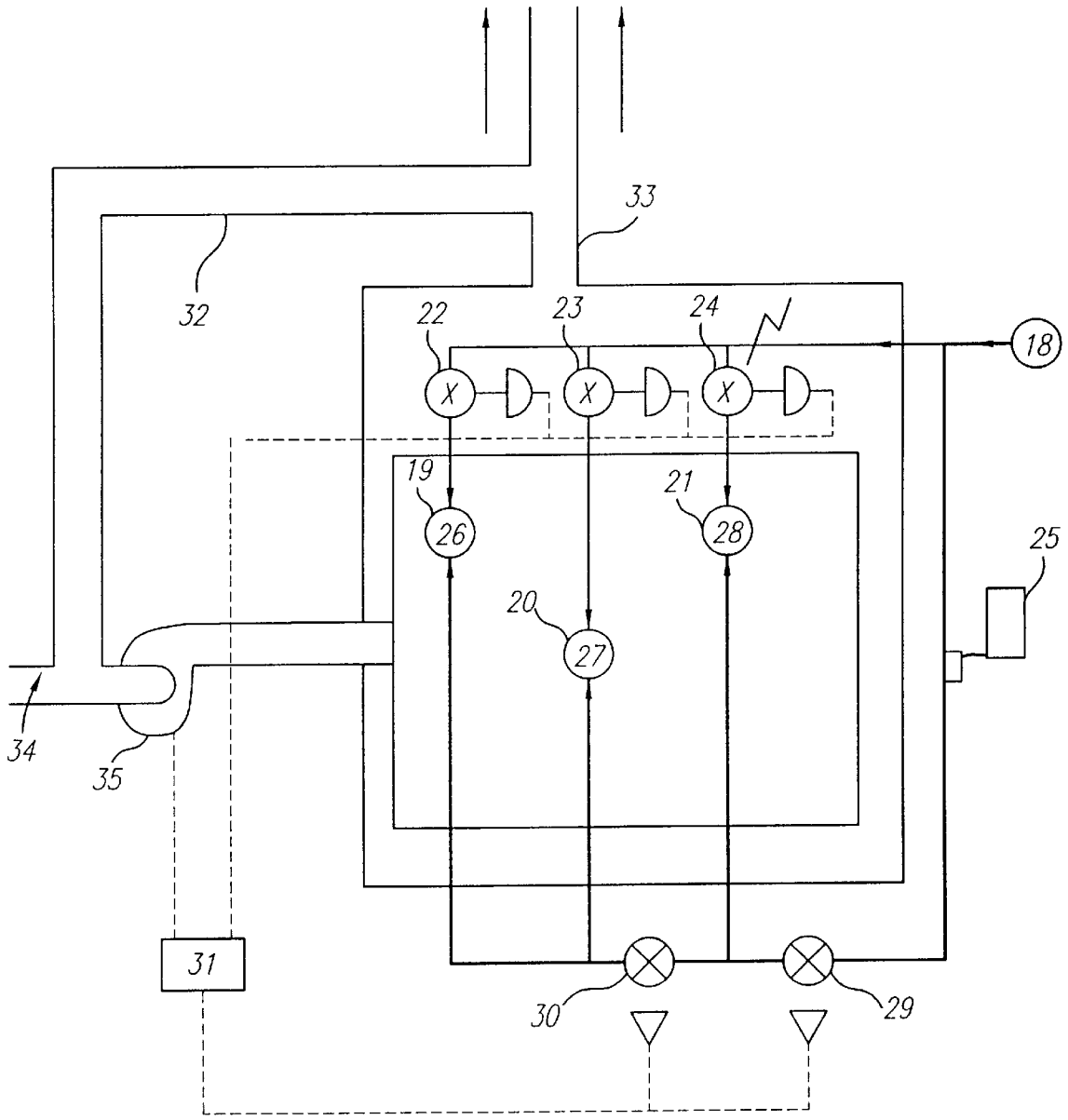
FIG. 3 is an exploded view of the burner components suitable for the invention.

FIG. 3 is a diagrammatic depiction of an emission control system on a boiler including combustion air fan, recirculation duct, main fuel supply system, and pilot-ignitor fuel system. Fuel 18 supplies the ignitors 19, 20 and 21, through the solenoid valves 22, 23 and 24. The main regulator 25 supplies gas to the burners 26, 27 and 28 through the primary control valve 29 and the secondary control valve 30. As shown in FIG. 2, the computer controller 31 operates the boiler on one burner only -burner 28, by opening the primary valve 29 but closing the secondary valve 30. Thus higher turndown is achieved so that the boiler may operate at lower load levels without the need for cycling the boiler on and off which is inefficient and damaging to the boiler. In addition, while the controller operates the boiler on burner 28 only without operating the burners 26 and 27, the controller leaves the pilots burning on the burners 26 and 27, so that boiler operations are completely compatible with the existing flame sensing system on the boiler.

A portion 32 of the flue gas 33 from the boiler is induced into the stream of fresh air 34 and drawn into the combustion air fan 35 before flowing on to the burners. Great advantage is achieved in modulating the flow of combustion air by equipping the fan with a standard variable speed drive, completely eliminating the need for any other modulating damper, and saving a great deal of energy by allowing operation at slower fan speeds most of the time.

Figure 4:
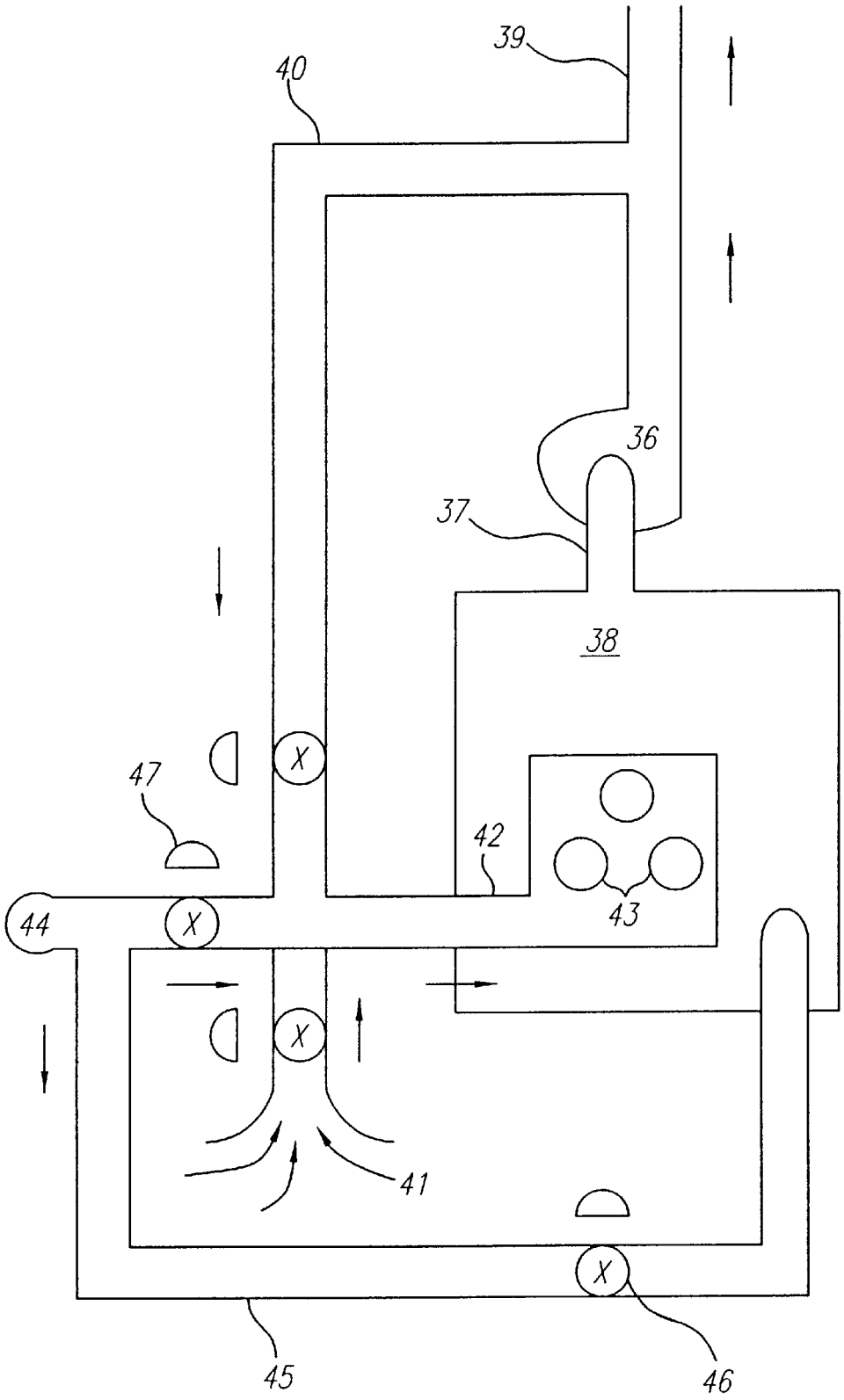
FIG. 4 is a diagrammatic depiction of a combustion air system suitable for effectively consuming rendering gas.

FIG. 4 is a diagrammatic description of the combustion air system suitable for the invention for effectively consuming rendering gas. The combustion air fan 36 draws flue gas 37 from the boiler 38 and blows the flue gas out the stack 39. A portion of the flue gas 40 recirculates by merging with the inlet fresh air 41 forming the combined stream 42 which is then drawn into the boiler 38 through the burners 43. In addition, rendering gas 44, which is primarily air, is also introduced to merge into the combined combustion air stream 42.

As stated earlier, the extremely efficient combustion achieved by the burners make them ideal for consuming rendering gas. Therefore gas with objectionable odors can be consumed entirely in the boiler and discharged without odor out of the boiler stack. In addition, several process advantages may be achieved through novel arrangement of the combustion air ducting to the boiler. While the rendering gases normally have very high dew points and low temperatures, the mixing of hot flue gas with the rendering gas, greatly reduces their tendencies to drop out moisture and corrode or gum up metal parts such as burners. The hot flue gas 40 mixes with the rendering gas 44, warming the combined stream and preventing condensation of corrosive liquids on metal parts. During start up of the boiler, before the flue gas warms up, rendering gas may be bypassed directly into the boiler fire box through the bypass duct 45. The damper 46 may be a one-way gravity damper which allows rendering gas to flow in one direction only into the boiler, and only when the rendering gas 44 is pressurized above the firebox pressure by at least 0.25 inches of water column. Therefore, shutting the damper 47 will allow automatic bypass of rendering gas into the boiler firebox.

Figure 5:
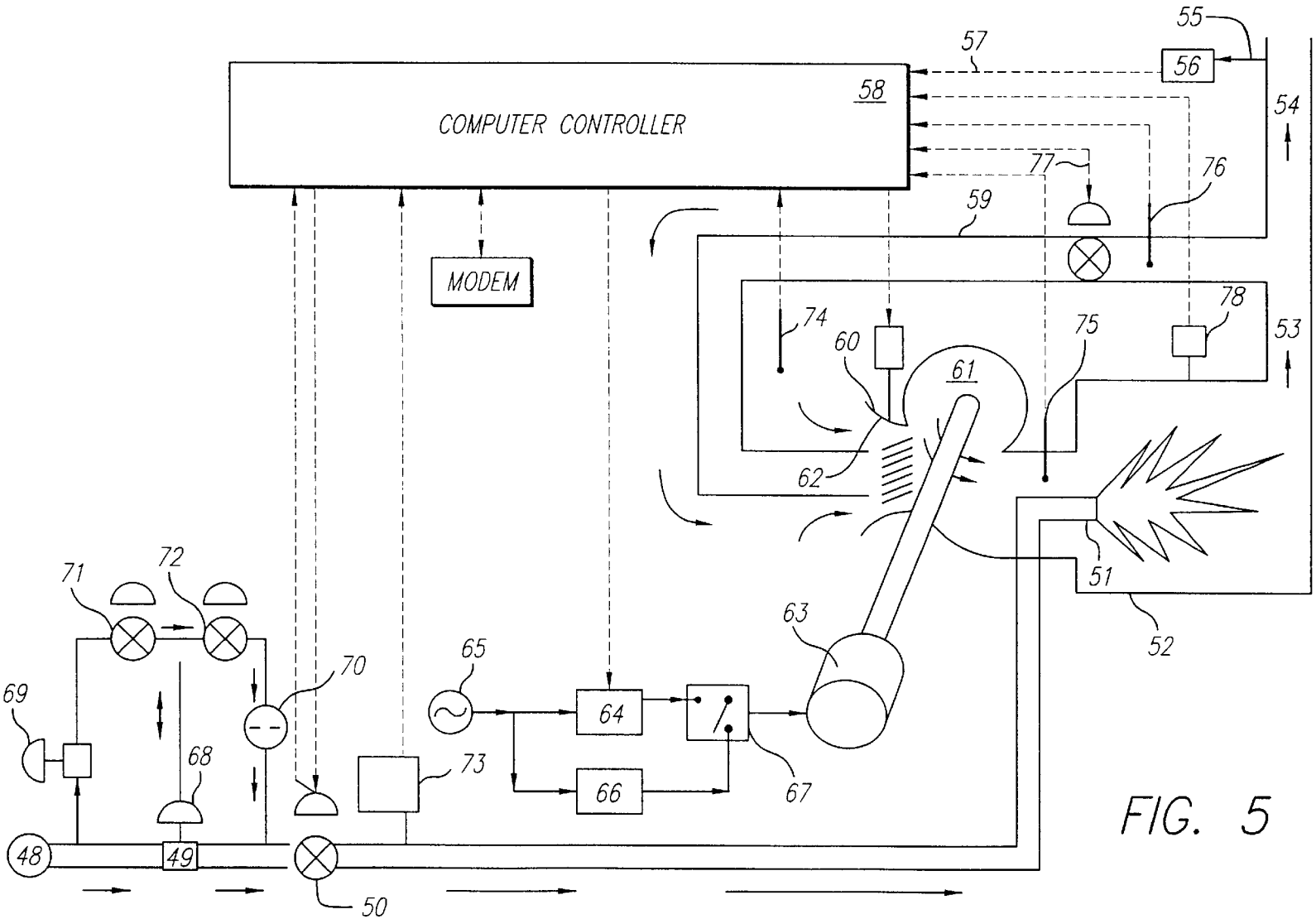
FIG. 5 is a diagrammatic depiction of an emission control system on a boiler showing the functions of the computer controller, variable speed drive and dampers.

FIG. 5 is a diagrammatic depiction of an emission control system on a boiler showing the functions of the computer controller, variable speed drive and dampers. Fuel gas 48 flows through the main pressure regulator 49, through the control throttle 50 and into the burner 51 where the gas burns, heating the boiler 52. Stack gases 53 flow up the stack 54. A sampling of stack gases 55 is drawn into the emissions analyzer 56. Signals 57 representing the composition of the stack gases are processed by the computer controller 58. A portion of the stack gases 53 are recirculated through a recirculation duct 59 into the inlet 60 of the combustion air fan 61, through the combustion air damper 62. The air fan 61 is driven by the motor 63, which in turn is driven by the variable frequency drive 64, which in turn is controlled by the computer controller 58. In case of failure of the computer or drive, power 65 bypasses the drive through the existing magnetic starter 66 through the bypass switch 67 to run the motor 63 at constant (full) speed. In this bypass mode where the computer also is no longer operating the throttle 50 and the combustion air damper 62, the throttle and damper may be reconnected by hand, if necessary, to operate on the original boiler control system. When fully operational, the computer may increase firing level of the boiler by increasing the gas pressure supplied by the main regulator 49 or by opening the throttle 50. The main regulator 49 normally operates by pilot pressure supplied to its main diaphragm 68 by the constant pressure pilot regulator 69. Gas bleeds out through the orifice 70 to reduce excess pressure on the diaphragm 68. Through the normally open solenoid valves 71 and 72, computer controls the gas pressure supplied to the diaphragm of the main regulator 49, and therefore the gas pressure of the main regulator. The computer may control gas pressure to any pressure less than constant pressure of the pilot regulator 69. When computer closes the solenoid valve 71, gas continues to bleed through the valve 72, reducing pressure. On the other hand, when the computer closes the valve 72, gas continues to flow to the diaphragm through the valve 71, restoring pressure. The computer can maintain constant pressure as monitored by the gas pressure transducer 73, by closing both valves 71 and 72 and periodically pulsing either open either to reduce or increase pressure. In case the computer fails, both valves open, restoring normal (maximum) operating pressure to the diaphragm from the pilot regulator.

The computer maintains proper rate of flow of combustion air into the fan inlet 60 to oxidize the fuel gas 48. The computer determines fuel flow rate by monitoring the pressure transducer 73, and plugging the value of the pressure signal into a nonlinear equation to compute fuel flow rate. In general the air flow is proportional to fan speed, so the computer generates and feeds a signal to the variable speed drive 64 which is proportional to the fuel flow. The computer fine tunes this proportionality constant by the absolute temperature of the air measured by the temperature probe 74. As flue gas is introduced through the recirculation duct 59, the computer increases the fan speed accordingly. The computer computes the fraction of flue gas recirculated (FGR) as the ratio of the (mixture temperature measured by the probe 75 minus the air temperature 74) divided by the (FGR temperature 76 minus the air temperature 74). The computer can fine tune the opening of the control damper 77 to achieve the desired fraction of FGR. While a large fraction of FGR reduces NOx significantly, it can also make the burner operate with a pulsating flame which can destroy the boiler. At the same time, restricting flow through the damper 62 while increasing the fan speed to maintain constant air flow serves to dampen flame pulsations. Significant energy savings (in the order of $10,000 to $50,000 for a typical boiler in a carpet mills in annual electric costs) is possible by operating the boiler at the minimum fan speed possible with the damper 62 closed just enough to dampen pulsations. The pressure and acceleration transducer 78 detects such pulsations so that the computer may shut down the boiler and/or further close the damper 62 to maintain stable flame.

The computer may also map out the ideal positions of the FGR and combustion air dampers and ideal fan speed for each firing level, by performing a preliminary mapping function in which the boiler is operated over the entire range of firing levels in which the computer opens the FGR damper 77 just enough to reduce NOx to the desired level, and in which the computer restricts the damper 62 just enough to prevent pulsations as detected by the transducer 78. The computer may perform this mapping function both when the boiler is hot and additionally before the boiler has warmed up completely. The computer then stores these (two separate sets of) values digitally. When NOx can not be reduced to the desired level without creating pulsations, the computer notes and stores the firing levels of such instability so that the FGR damper can be closed sufficiently to prevent pulsations at such firing levels and so that the boiler operates a minimum of time at these firing levels. When load would demand that the boiler operate at these levels or cross over these levels, the computer will cause the boiler cross over these levels as quickly as possible or operate at just above or below these levels so that net average NOx over time meets the desired limits.

Figure 6:
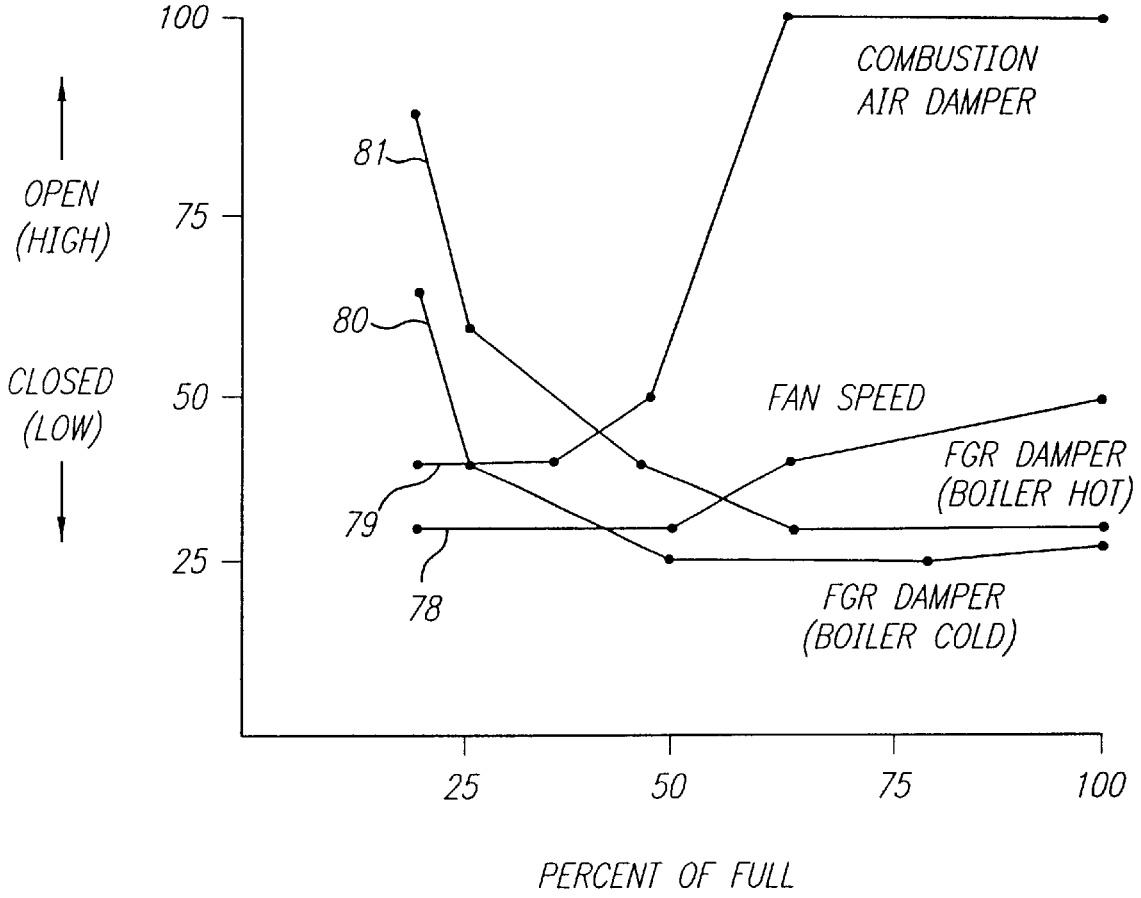
FIG. 6 is a graph depicting the computer map followed by the computer controller in controlling fan speed and damper positions as a function of boiler load.

FIG. 6 is a graph depicting the computer map followed by the computer controller in controlling fan speed and damper positions as a function of boiler load. This graph is stored as digital values in the computer memory so that very complicated relationships may be easily be followed by the computer for optimal operation of the boiler. As shown in the graph, the computer operates the fan starting at a constant low speed of about 35 percent of full fan speed, and then increases the fan speed proportionally to load starting at about 50 percent load as shown in the graph as the boiler load increases from 50 to 100 percent. The computer partially closes the combustion air damper as shown 79, so that pulsations in the flame are dampened at low fire, while the computer opens the damper completely at loads higher than 70 percent, to save fan energy. With a cold boiler, before warm-up, the FGR damper is opened 80 only as much as required to reduce NOx emissions to acceptable low levels. As the boiler fully warms up, the computer opens 81 the damper further to continue to control emissions. Different boilers require different speed and damper settings for different loads, so the values given on the graph are strictly examples, and not limiting to the claims.

Undoubtedly various changes may be made in the invention without departing from the following claims. Therefore the scope of the invention should only be limited by the following claims.

What is claimed is:

1. A process for controlling carbon monoxide and nitrogen oxides emissions from a boiler comprising:

passing a mixture of recirculated flue gas and combustion air through a fan and a damper into a burner;

increasing the speed of the fan at increasing firing level while varying the opening of the damper to prevent pulsations of said burner while allowing the boiler to operate with reduced fan speeds and reduced power consumption.

2. A process for controlling carbon monoxide and nitrogen oxides emissions from a boiler comprising:

passing a mixture of recirculated flue gas and combustion air through a fan into a burner;

increasing the speed of the fan at increasing firing level; mapping out and digitally storing those firing levels resulting in burner instability;

while operating said boiler at said digitally stored unstable firing levels, substantially reducing the fraction of recirculated flue gas so that NOx emissions increase at least 20 percent above average NOx emissions at firing levels outside said digitally stored unstable levels;

minimizing the time of operating said boiler at said unstable firing levels by increasing of decreasing the firing level to levels outside said firing levels so that net average NOx emissions from the boiler are within compliance limits.

3. A process for controlling carbon monoxide and nitrogen oxides emissions from a boiler comprising:

passing a mixture of recirculated flue gas and combustion air in an axial direction through an annulus created by a cone placed coaxially within a cylindrical member;

injecting gaseous fuel into said mixture through perforations in a ring on the exterior of said annulus;

igniting the gaseous fuel mixture downstream of said cone.

4. The process according to claim 3 wherein said cone blocks at least 40 percent of the flow cross section of said cylinder to force the majority of said combustion air mixture to flow in close proximity to said perforations and to create turbulence within said mixture to improve mixing and combustion stability.

5. The process according to claim 4 wherein a majority of said fuel is injected downstream of said cone to prevent ignited fuel products from overheating said cone.

6. The process according to claim 5 wherein said 40 percent blockage created by said cone comprises cone surface which is substantially nonperforated and is at least 98 percent solid area to prevent said combustion air mixture from bypassing said annulus so that as much combustion air as possible mixes with and oxidizes said fuel.

7. The process according to claim 3 wherein said recirculated flue gas is induced into the inlet of a combustion air fan, supplying said mixture to said annulus.

8. The process according to claim 7 wherein said combustion air fan is operated by a variable speed drive.

*9. A process for controlling the carbon monoxide and nitrogen oxides emissions from a boiler comprising the steps of:*

*passing a mixture of recirculated flue gas and combustion air through a combustion air fan and into a burner;*

*increasing the speed of the fan at increasing firing level to prevent pulsations of said burner while allowing the boiler to operate with reduced fan speeds and reduced power consumption.*

*10. The process according to claim 9 further comprising the steps of:*

*passing said mixture of recirculated flue gas and combustion air in an axial direction through an annulus created by a cone placed coaxially within a cylindrical member;*

*injecting gaseous fuel into said mixture through perforations in a ring on the exterior of said annulus;*

*igniting the gaseous fuel mixture downstream of said cone.*

*11. The process according to claim 10 wherein said cone blocks at least 40 percent of the flow cross section of said cylindrical member to force the majority of said combustion air mixture to flow in close proximity to said perforations and to create turbulence within said mixture to improve mixing and combustion stability.*

*12. The process according to claim 11 wherein a majority of said fuel is injected downstream of said cone to prevent ignited fuel products form overheating said cone.*

*13. The process according to claim 12 wherein said 40 percent blockage created by said cone comprises the surface of said cone which is substantially nonperforated and is at least 98 percent solid area to prevent said combustion air mixture from bypassing said annulus so that as much combustion air as possible mixes with and oxidizes said fuel.*

*14. The process according to claim 10 wherein said recirculated flue gas is induced into the inlet of said combustion air fan for supplying said mixture to said annulus.*

*15. The process according to claim 14 wherein said combustion air fan is operated by a variable speed drive.*

* * * * *